United States Patent [19]

Tymon et al.

[11] Patent Number: 4,800,041

[45] Date of Patent: Jan. 24, 1989

[54] SUSPENSIONS OF SHEET SILICATE MATERIALS AND PRODUCTS MADE THEREFROM

[75] Inventors: Thomas M. Tymon; Shelly S. Niznik, both of Lancaster, Pa.

[73] Assignee: Armstrong World Industries, Inc., Lancaster, Pa.

[21] Appl. No.: 913,391

[22] Filed: Oct. 3, 1986

Related U.S. Application Data

[63] Continuation-in-part of Ser. No. 794,724, Nov. 4, 1985, abandoned.

[51] Int. Cl.$^4$ ............................ C04B 20/02; C04B 20/06
[52] U.S. Cl. ............................ 252/378 R; 106/86; 106/121; 106/DIG. 3; 264/110
[58] Field of Search .................. 106/DIG. 3, 121, 86; 162/3, 9; 264/110; 252/378 R

[56] References Cited

U.S. PATENT DOCUMENTS

| | | | |
|---|---|---|---|
| 3,325,340 | 6/1967 | Walker | 162/3 X |
| 3,356,611 | 12/1967 | Walker et al. | 106/DIG. 3 X |
| 3,434,917 | 3/1969 | Kraus et al. | 162/30 R |
| 3,753,923 | 8/1973 | Wada | 106/DIG. 3 X |
| 3,824,297 | 7/1974 | Wada | 264/110 X |
| 3,830,892 | 8/1974 | Wada | 264/110 X |
| 4,239,519 | 12/1980 | Bealle et al. | 65/20 R |
| 4,269,628 | 5/1981 | Ballard et al. | 106/860 R |
| 4,425,465 | 1/1984 | Padget et al. | 106/DIG. 3 X |

FOREIGN PATENT DOCUMENTS 0155175 9/1985 European Pat. Off. .

*Primary Examiner*—William R. Dixon, Jr.
*Assistant Examiner*—Karl Group

[57] ABSTRACT

An aqueous suspension of sheet silicate and the method of making the same are disclosed. The suspension is produced by treating crystals of 2:1 layer sheet silicates with a solution containing a water soluble salt of a cation of a secondary, tertiary or quaternary alkyl ammonium compound and thereafter dispersing the vermiculite crystals.

17 Claims, No Drawings

SUSPENSIONS OF SHEET SILICATE MATERIALS AND PRODUCTS MADE THEREFROM

CROSS REFERENCE TO RELATED APPLICATION

This application is a continuation-in-part of U.S. application Ser. No. 794,724 filed for Nov. 4, 1985, now abandoned, filed in the name of Thomas M. Tymon, originally entitled "Suspensions of Sheet Silicate Materials and Products Made Therefrom.

BACKGROUND OF THE INVENTION

It is known how to prepare a vermiculite paper via a standard papermaking, i.e. wet laid, process using highly dissociated vermiculite. Such dissociated vermiculite can be typically prepared, for example, by the process of U.S. Pat. No. 3,325,340, according to which crystals of vermiculite are treated with various cations to cause the vermiculite to swell to a great extent, i.e., about 30 times its original dimension, the most effective cations being primary alkylammonium cations having between 3 and 6 carbon atoms inclusive in each alkyl group, especially those of n-butylammonium, iso-butylammonium, propylammonium and iso-amylammonium. It has been discovered that while these vermiculite suspensions so produced can be utilized to form materials having many excellent properties, such materials do show a high degree of moisture sensitivity.

Copending applications Ser. No. 662,057, filed Oct. 18, 1984, and Ser. No. 715,973, filed Mar. 25, 1985, disclose a method of making water-resistant films and silicate materials that comprises conducting an ion exchange reaction on said dissociated vermiculite utilizing, respectively, specified guanidine cation analogs and multiamine derived cations, both of which are defined therein, as the exchange cations to thereby form a flocced vermiculite material from which a film or paper can be made that has a high degree of water resistance and high temperature resistance.

DESCRIPTION OF THE INVENTION

It has now been discovered that aqueous suspensions of sheet silicates such as vermiculite and micas can be prepared by treating crystals of vermiculite and/or the mica, with a solution containing a water soluble salt of a secondary, tertiary or quaternary alkyl ammonium compound for a time effective to obtain swelled crystals, which can then be sheared producing a dispersion.

In another aspect of the invention, these dispersions could be utilized to make highly water-resistant films, by, for example, drawing the dispersions down into a film and then contacting the prepared film with a source of guanidine cation analogs or multiamine derived cations to thereby effect an ion exchange reaction between at least some of the exchangeable interstitial ions and at least some of the guanidine cation analogs or multiamine derived cations. If desired, however, this second ion exchange with guanidine or miltiamine can be done directly to the dispersion itself.

It has been unexpectantly discovered that the aqueous suspensions prepared according to the process of the present invention contain processing advantages over the prior art dispersions, and, furthermore, films made from the dispersions of the present invention are mechanically superior to the films made from prior art dispersions. This is particularly true when the diethylammonium cation is used in the first step.

The alkyl ammonium cations that are useful in the present invention for treating the crystals of vermiculite or mica correspond to the Formula:

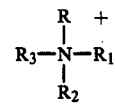

wherein $R$, $R_1$, $R_2$ and $R_3$ are independently selected from H or a $C_{2-4}$ alkyl group, with the proviso that no more than two of $R$, $R_1$, $R_2$ and $R_3$ are H. The preferred alkyl groups which are substituents on the nitrogen atom are those that have either two or three carbon atoms. The most preferred alkyl ammonium cations are diethyl ammonium, triethyl ammonium, tetraethyl ammonium and dipropyl ammonium; of these, the diethyl ammonium is most especially preferred.

Layered silicates to which the instant process can be applied to are 2:1 layered silicates. A discussion regarding 2:1 layered silicates can be found in the text *Crystal Structures of Clay Materials and their X-Ray Identification* by G. W. Brindley and G. Brown, published by Mineralogical Society, 1980 (especially pages 2-10). The term "mica" is used herein to refer to the layered silicates having a charged density approximately equal to one. While vermiculites have a charge density of approximately in the range of 0.6-0.9. Some specific layered silicates which can be used in the instant invention are: vermiculite, muscovite, phlogopite, biotite, fluorphlogopite, lepidolite and lepidomelane.

The term "vermiculite" is used herein to refer to the group of rock-forming mineral species characterized by a layer lattice structure in which the silicate layer units have a thickness of approximately 10 Å, the main elements present in the layers being magnesium, iron, aluminium, silicon and oxygen, the layers being separated by one or two sheets of water molecules associated with cations such as magnesium, calcium, sodium and hydrogen and the layers being of considerable lateral extent relative to the thickness of the basic 10 Å unit layer. The term "vermiculite" as used herein therefore includes minerals consisting wholly or largely of vermiculite, or minerals of a mixed-layer type containing vermiculite layers as an important constituent, such as hydrobiotites and chlorite-vermiculites, but does not include minerals of the montmorillonite group.

As a general rule, the swelling of layered silicates is affected by the charge density. There are, for example, certain cations which do not promote the swelling of high charge density layered silicates thus preventing the preparation of stable waterbased dispersions using these materials. Specifically, it is not possible to promote swelling of high charge density layered silicates (micas) from lithium and n-butyl ammonium cations to the extent needed to prepare stable suspensions. It has been found, however, that the organic cations of the instant invention can be used to swell high change density 2:1 layered silicates, (micas) Preferably, the cation used to swell the mica layers are the dialkyl ammonium cation having from 2-4 carbon atoms per alkyl group. Of these, the most preferred are the ethyl and propyl.

The dissociated sheet silicate suspension can be prepared by contacting crystals of 2:1 layered silicates with a solution containing an alkyl ammonium cation as specified above, immersing the treated crystals in water for a sufficient length of time to allow ion exchange thereby causing the crystals to swell, and subjecting the resulting swollen crystals to shear stress while they are immersed in water whereby these crystals become dispersed to form a suspension.

The 2:1 sheet silicates typically used are micas or vermiculite. The process can be performed with either natural or synthetic 2:1 layered silicates. When natural 2:1 layered silicates are used, potassium is frequently encountered as the interstatial ion. Since potassium is difficult to exchange, the length of time required for the first step of the instant invention becomes impractical. It is therefore preferred with these layered silicates to perform an initial ion exchange, thereby preparing the natural 2:1 layered silicate for the instant process. The potassium can be exchanged with the sodium or with sodium and then lithium. Preferably, with natural mica, potassium is exchanged with sodium which is then exchanged with lithium. The instant process can then be performed by exchanging the lithium with the selected alkyl ammonium cation. With vermiculite, it is preferred merely to exchange the exchangeable interlayer ion with the sodium. The vermiculite layered silicate is then subjected to the instant invention. By these ion exchange preparation steps, the length of time necessary to swell the layers of the 2:1 layered silicates is greatly reduced and the dispersion can be prepared quickly. An acceptable length of time for the initial ion exchange reaction is from about ½ hour to about 24 hours. Preferably, it is from about an ½ hour to 10 hours.

After swelling with the alkyl ammonium compound has been completed and before shearstress is applied to produce the dispersion (suspension), the swelled 2:1 layered silicate preferably is filtered and washed with water to remove residual ions. After this washing, the swelled 2:1 layered silicate can then be placed in a solution of the appropriate polar solvent in order to produce the dispersion. The solvent generally used is water. When preparing the solution for the dispersion, the solids content of the 2:1 layered silicate can be adjusted. Shear is applied to the swelled silicate layers in order to disperse them in the solution. The shearstress or shearforce can be provided by apparatus such as blenders or mills. Preferred mill type apparatus is the counter-rotating disk type or the ultra-sonic processing unit.

It has been discovered that vermiculite and mica dispersions formed according to the process of the present invention have better processability as compared to prior art dispersions. The instant dispersions can be more easily handled and washed. The instant dispersions can also by filtration, be washed to a residual salt-free state in substantially less time than prior art dispersions.

In order to produce high temperature water-resistant products, such as a films, from the dispersions of the present invention, the dispersions are reacted, generally with agitation, with a source of guanidine cation analogs or multiamine derived cations (as described in the aforementioned copending applications which descriptions are herein incorporated by reference). U.S. patent application Ser. No. 715,973 states that the term "multiamine derived cations", when used in reference to the exchange cations for the present invention, refers to low molecular weight, non-polymeric, di, tri and/or tetra amino functional compounds, wherein the amine moieties have been modified, such as by being protonated, to thereby be positively charged. Diamines are the multiamine compounds of choice. The preferred diamines will generally correspond to the formula:

$$R_3N-(CX_2)_n-NR_3$$

wherein (1) each R is independently selected from hydrogen, a C1–C8 straight or branched chain alkyl group, a C3–C6 ayclic alkyl group, or an aryl group, with the proviso that there be no more than one aryl group on each nitrogen, (2) each X is independently selected from hydrogen, an alkyl group or an aryl group and (3) n represents an integer from 2 to 15, with the option that, when n is 3 or more, the CX2 groups may form ringed moieties which may be aromatic.

The guanidine cations described in U.S. patent application No. 662,057 are:

"Exchange cations that may be utilized in the present invention will be derived from compounds that correspond to the formula:

$$\begin{matrix} & R_1 & \\ & | & \\ R- & C- & R_2 \end{matrix}$$

wherein R, $R_1$ and $R_2$ are individually selected from $-NH_2$ and $-CH_3$, with the proviso that at least two of R, $R_1$, and/or $R_2$ can be replaced by substituents such as $C_1-C_5$ alkyl, $C_1-C_5$ alkenyl, $C_1-C_5$ alkynyl and, wherein further one or more groupings of two of such substituents can join to form rings which may be optionally aromatic." The guanidine and multiamine cations function as exchange cations with the dispersed 2:1 layered silicates to thereby effect an ion exchange reaction thereby forming a flocced mineral suspension which then can be utilized to make the product desired. The preferred concentrate for the guanidinium or multiamine ion is from about 0.2 molar solution to about a one molar solution.

Alternatively, the dispersions of the present invention can be formed into a film and the cationic exchange reaction utilizing the guanadine cation analogs or multiamine derived cations can be carried out on the film. This ion exchange can conveniently be done by immersing the wet film in a solution of the miltiamine or guanadine cation analogs.

It has been discovered that films made from the dispersions of the present invention according to this procedure are mechanically superior to films made from prior art dispersions.

The treatment of the 2:1 layered silicates with the alkyl ammonium cation in the first step of the instant process is done for an effective length of time. During washing, after the exchange, a visual examination is generally sufficient to ascertain whether there has been ion exchange thereby swelling the silicate layers to a point where they can be dispersed. Preferably, this exchange in the first step of the instant process is conducted for a minimum of ½ hour. While there is no real maximum length of time for this exchange, it is desirable to complete the first step in as short a time period as possible. The ion exchange of the first step can be conducted over a period of time from about ½ hour to about 10 hours and most preferably from about 2 to about 5 hours.

The alkyl ammonium cation in this first step should also be provided in a sufficient amount to be effective in conducting this ion exchange of the 2:1 layered silicate. While a wide range of molar ratios of alkyl ammonium cation to the silicate is appropriate, a desirable concentration range for the alky ammonium cation solution is from about 0.2 to about 3 molar, the ratio of solution to silicate is a minimum of one gram of solution per gram of silicate.

Preferred film-making techniques used for the dispersions of the instant invention include drawing the film down onto a convenient surface and then exposing the film to a solution of melamine or guanidine cation for ion exchange. After a sufficient length of time has allowed the ion exchange to take place, the film can either be removed or another layer of film can be drawn down on top of this film surface in order to produce a thicker film. This film in turn is also immersed in a solution containing guanidinium or melaminium cations for a sufficient length of time to allow cation exchange. If the film is then of a sufficient thickness, it can be removed or another draw down and ion exchange step can be completed to achieve an even thicker film.

The following examples are offered to illustrate the instant invention and not to limit it. All parts and percentages are by weight unless otherwise indicated.

Example 1

A 100 gram sample of sodium vermiculite was refluxed for 5 hours in one liter of a one-half molar solution of diethylammonium hydrochloride in water. The vermiculite was then washed in a Buchner funnel to remove excess salts and to promote swelling. In order to make sure of the removal of the residual salt, silver nitrate solution was used to test for chloride. The resulting swelled vermiculite was then sheared in a Waring blender to form a fine homogeneous dispersion. The solids content of the solution was then adjusted to 10% solids. A film was drawn down from this material by using a 4.5 mil Byrd applicator, which was 5 inches wide, to thereby draw down a 4½ mil thick wet film of the dispersion on a glass plate the film was 8½ by 11 inches.

The glass plate, with the film attached, was then immersed in a 1M guanidine hydrochloride solution to cause a cation exchange between the guanidinium cations and the vermiculite's interlayer cations. A skin was formed, seemingly instantaneously, on the film which indicated such an ion exchange was taking place. In 10 minutes the film was removed from the plate, washed in deionized water to remove residual salts, and dried. The film had excellent flexibility and strength-retention when wet.

Example 2

A 100 gram sample of sodium vermiculite was refluxed for 5 hours in one liter of a one-half molar solution of triethyl ammonium chloride in water. The vermiculite was then washed to remove excess salts and to promote swelling. The resulting swelled vermiculite was then sheared in a Waring blender to form a fine homogeneous dispersion. The solids content of the solution was then adjusted to 10% solids. A film was drawn down from this material by using a 4.5 mil Byrd applicator, which was 5 inches wide, to thereby draw down a 4½ mil thick wet film of the dispersion on a glass plate. The glass plate, with the film attached, was then immersed in a 1M guanidinium hydrochloride solution to cause a cation exchange between the guanidinium cations and the vermiculite's interlayer cations. A skin was formed, seemingly instantaneously, on the film which indicated such an ion exchange was taking place. In 10 minutes the film was removed from the plate, washed in deionized water to remove residual salts, and dried. The film had excellent flexibility and strength-retention when wet.

Example 3

A 100 gram sample of sodium vermiculite was refluxed for 5 hours in one liter of a one-half molar solution of tetraethyl ammonium in water. The vermiculite was then washed to remove excess salts and to promote swelling. The resulting swelled vermiculite was then sheared in a Waring blender to form a fine homogeneous dispersion. The solids content of the solution was then adjusted to 10% solids. A film was drawn down from this material by using a 4.5 mil Byrd applicator, which was 5 inches wide, to thereby drawn down a 4½ mil thick wet film of the dispersion on a glass plate. The glass plate, with the film attached, was then immersed in a 1M guanidinium hydrochloride solution to cause a cation exchange between the guanidinium cations and the vermiculite's interlayer cations. A skin was formed, seemingly instantaneously, on the film which indicated such an ion exchange was taking place. In 10 minutes the film was removed from the plate, washed in deionized water to remove residual salts, and dried. The film had excellent flexibility and strength-retention when wet.

Example 4

The 2:1 layered silicate used was a high charged density mica (sodium phlogopite). Five grams of the sodium phlogopite (North Burgess phlogopite, potassium depleted using the method as described in *Clays and Clay Minerals*, Vol. 14, Pgs. 69–81; (1966) and Vol. 16, Pgs. 321–322) was refluxed with one mole of LiCl in an aqueous solution. After refluxing for eight hours, the lithium phlogopite was washed free of excess of lithium chloride with dionionized water. Silver nitrate was used to make sure that the washing was complete.

It can be noted at this point that there was no macroscopic swelling of the lithium phlogopite observed thus a stable water-based dispersion could not be prepared. Although almost all of the sodium in the phlogopite was replaced with lithium. The lithium phlogopite merely settled out of the water.

The lithium phlogopite thus prepared was collected and divided into two portions of approximately 2.5 grams each. These portions were treated as described in part A and B below.

Part A

A 250 ml. aqueous solution of one molar butyl ammonium chloride was prepared by adding N-butyl amine to dioionized water and adjusting the pH of the solution to seven. One of the 2.5 gram portions of lithium phlogopite was then refluxed in this solution for approximately eight hours. After refluxing, the N-butyl ammonium phlogopite was washed free from the solution using dioionized water. The washed solution was tested with ammonium nitrate until there was no indication of chloride. No macroscopic swelling of the butyl ammonium phlogopite was observed, thus it was not possible to prepare a stable water-based dispersion from it.

The lithium phlogopite and the N-butyl ammonium phlogopite prepared in this example were both tested using x-ray diffraction analysis in order to measure the space between the layers. The spacing (d001) for the lithium phlogopite was 12.1 (A). The spacing measured for the N-butyl ammonium phlogopite (d001) was 14.9 A. This indicates that the interstitial ions were successfully exchanged. Swelling of the phlogopite was achieved to a small extent using the N-butyl ammonium cation but this swelling was not sufficient to enable a dispersion to be prepared.

Part B

A one molar, 250 milliter (ml.) solution of diethyl ammonium chloride was prepared by adding diethyl amine to 250 ml. of dionionized water and adjusting the pH to seven using HCL. The second 2.5 gram portion of lithium phlogopite was refluxed in this solution for approximately 8 hours. After refluxing the diethyl ammonium phlogopite collected was washed free from the residual salts. Silver nitrate was again used to determine that the phlogopite was chloride free. A swelling of the diethyl ammonium phlogopite was observed. The spacing (d001) measured for the diethyl ammmonium phlogopite was 17.4 A, thus the ions were successfully exchanged. A solution containing the diethyl ammonium phlogopite was subjected to shearstress and a stable water-based solution was prepared using approximately 50 mes. of water. The dispersion was viscus and the viscosity increased by water removal in order to prepare a 10% solids dispersion.

The diethyl ammonium phlogopite dispersion furthermore had good film-forming properties. A glass plate was used to caste a film from the diethyl ammonium phlogopite dispersion with a 10 mill Byrd blade.

Example 5

Lithium fluorphlogopite was used to prepare a stable dispersion using the diethyl ammonium cation. The lithium fluorphlogopite was obtained using a synthetic mica sodium fluorphlogopite which was then subjected to ion exchange to produce the lithium fluorphlogopite. 2.5 g. of lithium fluorphlogopite was refluxed with 250 ml. of a one molar solution of diethyl ammonium chloride. After refluxing the diethyl ammonium phlogopite was washed free from residual salt. It was observed that the diethyl ammonium phlogopite did swell and a stable water-base dispersion was prepared. The dispersion was reduced to a 10% solids dispersion. The dispersion was then used to prepare a film.

Example 6

Sodium Effingham muscovite (derived from the potassium depleated) was used to prepare lithium muscovite. The lithium muscovite (2.5 g) was then refluxed for eight hours with 250 ml. of a one molar solution of diethyl ammonium chloride. The muscovite was then washed until it was free from residual salt. Swelling was noted. A stable water-based dispersion was prepared and reduced to a 10% solids dispersion. A film was then prepared from this dispersion.

What is claimed is:

1. A composition comprising:
a 2:1 layered silicate material selected from the group consisting of mica and vermiculite having alkyl ammonium cations which correspond to the formula

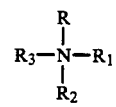

wherein R, $R_1$, $R_2$ and $R_3$ are independently selected from H or a $C_{2-4}$ alkyl group, further providing that no more than two of R, $R_1$, $R_2$ and $R_3$ are hydrogen.

2. A composition as described in claim 1 wherein the cation is selected from the group consisting of diethyl ammonium, triethyl ammonium, tetraethyl ammonium and dipropyl ammonium.

3. A method of preparing a flocced mineral suspension of sheet silicates, which comprises:
(a) treating 2:1 layered silicate crystals selected from the group consisting of mica and vermiculite with a solution containing a cation selected from the group consisting of diethyl ammonium, triethyl ammonium, tetraethyl ammonium, and dipropyl ammonium, for an effective length of time to allow ion exchange, and to swell layers of the silicate crystals; and
(b) dispersing the layers using shear stress to thereby form an aqueous sheet silicate suspension, and then;
(c) contacting the sheet silicate suspension with at least one species of guanidine cation analogs to thereby effect an ion exchange reaction between at least some exchangeable interstitial ions in the silicate crystals and at least some of the guanidine cations to form a flocced mineral suspension.

4. The method of claim 3 wherein the silicate crystals selected as a starting material was a potassium depleted natural mica which was exchanged with sodium and then lithium, followed by steps a, b, and c, further providing that the cation selected in step (a) was diethyl ammonium.

5. The method of claim 3 wherein the silicate crystals selected was vermiculite.

6. A method of preparing a flocced mineral suspension of sheet silicates, which comprises:
(a) treating 2:1 layered silicate crystals selected from the group consisting of mica and vermiculite with a solution containing a cation selected from the group consisting of: diethyl ammonium, triethyl ammonium, tetraethyl ammonium, and dipropyl ammonium, for an effective length of time to allow ion exchange, and to swell layers of the silicate crystals; and
(b) dispersing the layers using shear stress to thereby form an aqueous sheet silicate suspension, and; then
(c) contacting the sheet silicate suspension with at least one species of multiamine derived cations to thereby effect an ion exhcnage reaction between at least some exchangeable interstitial ions in the silicate crystals and at least some of the multiamine derived cations to form a flocced mineral suspension.

7. The method of claim 6 wherein the silicate crystals selected was a potassium depleted natural mica which was exchanged with sodium and then lithium, followed by steps a, b, and c; further providing that the cation selected in step (a) was diethyl ammonium.

8. The method of claim 6 wherein the silicate crystals selected was vermiculite.

9. A composition comprising: a potassium-depleted natural mica having diethyl ammonium cations which were introduced into the potassium-depleted natural mica by ion exchange, wherein the mica can be sheared in water to produce a dispersion.

10. A composition comprising:
a 2:1 layered silicate material selected from the group consisting of mica and vermiculite having alkyl ammonium cations which correspond to the formula:

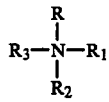

wherein R, R1, R2, and R3 are independently hydrogen or an alkyl group having two or three carbon atoms per group, provided however, that no more than two of R, $R_1$, $R_2$, $R_3$ are hydrogen, and further providing that the composition can be sheared in water to produce a dispersion.

11. The composition of claim 10 wherein the silicate crystals are mica.

12. A composition comprising: a 2:1 layered silicate material selected from the group consisting of mica and vermiculite wherein the said silicate material has dipropyl ammonium cation which were introduced by ion exchange, further providing that the composition can be sheared in water to produce a dispersion.

13. A composition comprising: a 2:1 layered silicate material selected from the group consisting of mica and vermiculite wherein the said silicate material has diethyl ammonium cations which were introduced by ion exchange, further providing that the composition can be sheared in water to produce a dispersion.

14. A method of preparing an aqueous suspension of sheet silicates, which comprises:
(a) treating 2:1 layered silicate crystals selected from the group consisting of mica and vermiculite with a solution; said solution containing a cation having the formula:

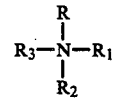

wherein R, R1, R2, and R3 are independently hydrogen or an alkyl group having two or three carbon atoms per group, provided however, that no more than two of R, $R_1$, $R_2$, and $R_3$ are hydrogen; for an elective length of time to allow ion exchange and swell layers of the silicate crystals; and
(d) dispersing the layers in water using shear stress to thereby form an aqueous sheet silicate suspension the composition can be sheared in water to produce a dispersion.

15. The method of claim 14 wherein the silicate crystals are mica.

16. The method of claim 14 wherein the cation is diethylammmonium or dipropyl ammonium.

17. A method of preparing an aqueous suspension of natural mica which comprises:
(a) treating potassium depleted natural mica with a solution having diethyl ammonium cations for an effective length of time to allow ion exchange, and swell layers of the natural mica; and
(b) dispersing the layers in water using shear stress to thereby form a sheet silicate suspension.

* * * * *